US011729063B1

(12) United States Patent
Gopalarathnam

(10) Patent No.: US 11,729,063 B1
(45) Date of Patent: Aug. 15, 2023

(54) VISUALLY GUIDED TOPOLOGY WIRING

(71) Applicant: NVIDIA Corporation, Santa Clara, CA (US)

(72) Inventor: Sudharsan Dhamal Gopalarathnam, Bothell, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/580,454

(22) Filed: Jan. 20, 2022

(51) Int. Cl.
*H04L 41/12* (2022.01)
*H04L 67/141* (2022.01)

(52) U.S. Cl.
CPC ............ *H04L 41/12* (2013.01); *H04L 67/141* (2013.01)

(58) Field of Classification Search
CPC .............................. H04L 41/12; H04L 67/141
USPC ......................................................... 709/223
See application file for complete search history.

(56) References Cited

U.S. PATENT DOCUMENTS

| | | | |
|---|---|---|---|
| 9,262,372 B1* | 2/2016 | Kabbani ................. | H04L 49/70 |
| 10,515,042 B1* | 12/2019 | Yang .................... | G06F 13/4282 |
| 10,812,988 B1* | 10/2020 | Khan ..................... | H04L 41/22 |
| 10,938,739 B1* | 3/2021 | Jain ....................... | H04L 47/786 |
| 11,582,297 B1 | 2/2023 | Gopalarathnam | |
| 2007/0195711 A1 | 8/2007 | Morris et al. | |
| 2007/0274239 A1 | 11/2007 | Nguyen et al. | |
| 2011/0070767 A1 | 3/2011 | Caveney et al. | |
| 2016/0091685 A1* | 3/2016 | Raza ................. | H04Q 11/0066 398/19 |
| 2016/0099841 A1* | 4/2016 | Tiwari ................... | H04W 76/11 370/255 |
| 2016/0323153 A1* | 11/2016 | Cordray .............. | H04L 67/1001 |
| 2017/0054603 A1* | 2/2017 | Kulkarni ................ | H04L 41/12 |
| 2018/0006894 A1* | 1/2018 | Power .................... | H04L 41/12 |
| 2019/0027001 A1* | 1/2019 | Sebastian ........... | H01R 13/7175 |
| 2019/0123958 A1* | 4/2019 | Lederer ................... | H04L 41/12 |
| 2019/0319868 A1* | 10/2019 | Svennebring ......... | H04L 41/147 |

(Continued)

FOREIGN PATENT DOCUMENTS

| | | | | |
|---|---|---|---|---|
| EP | 3142296 B1 * | 4/2018 | ......... | H04L 41/0803 |
| RU | 2013123133 A * | 11/2014 | ........... | G06F 15/177 |

OTHER PUBLICATIONS

Banks, Ethan. "What is Prescriptive Topology Manager (PTM) & DOT?" Aug. 27, 2014. Blog: ethancbanks.com. (Year: 2014).*

(Continued)

*Primary Examiner* — Melvin H Pollack
(74) *Attorney, Agent, or Firm* — Sheridan Ross PC

(57) ABSTRACT

Methods, systems, and devices are provided herein for providing a visually guided topology wiring scheme. As described herein, after determining that a first end of a cable has been inserted at a first port of a first peer device, a wiring application may reference a topology file to identify a second port of a second peer device with which the first peer device is intended to have a link. Subsequently, the wiring application may activate an indicator associated with the second port to mimic an indicator associated with the first port. For example, the wiring application may cause both indicators associated with each port to flash according to a same or similar flashing pattern, to produce or illuminate at a similar or identical color (e.g., approximately the same color), to flash at approximately a same rate, or by substantially synchronizing a flashing of each indicator.

20 Claims, 9 Drawing Sheets

(56) References Cited

U.S. PATENT DOCUMENTS

| | | | | |
|---|---|---|---|---|
| 2019/0327188 A1* | 10/2019 | Rivaud | ............... | H04L 43/0864 |
| 2019/0379594 A1* | 12/2019 | Johnsen | ................ | H04L 49/201 |
| 2019/0385057 A1* | 12/2019 | Litichever | ............... | H04L 63/14 |
| 2020/0089561 A1* | 3/2020 | Laing | .................. | G06F 11/0727 |
| 2020/0184784 A1* | 6/2020 | Sainath | .................... | G08B 5/22 |
| 2020/0275174 A1* | 8/2020 | Qi | ......................... | G02B 6/4452 |
| 2021/0073449 A1* | 3/2021 | Segev | ..................... | G06F 30/20 |
| 2021/0258238 A1 | 8/2021 | Bose | | |
| 2021/0367848 A1* | 11/2021 | Kaag | .................... | H04L 41/0869 |
| 2022/0006697 A1* | 1/2022 | Hill | .................... | H04L 41/0883 |
| 2022/0014441 A1* | 1/2022 | Sethi | ..................... | H04L 61/103 |
| 2022/0303331 A1* | 9/2022 | Svennebring | ...... | H04N 21/8456 |
| 2022/0334910 A1* | 10/2022 | Narayanan | .............. | H04L 43/50 |

OTHER PUBLICATIONS

Edelman, Jason. "Prescriptive Topology Manager (PTM) Support with NX-API on the Nexus 9000?" Sep. 19, 2014. Blog: jedelman. com. (Year: 2014).*

Official Action for U.S. Appl. No. 17/580,470, dated Jul. 22, 2022 11 pages.

Notice of Allowance for U.S. Appl. No. 17/580,470, dated Oct. 28, 2022 9 pages.

Official Action for U.S. Appl. No. 18/091,185, dated Apr. 11, 2023 15 pages.

Extended Search Report for European Patent Application No. 23152616.1, dated Jun. 14, 2023, 10 pages.

* cited by examiner

VISUALLY GUIDED TOPOLOGY WIRING

FIELD OF THE DISCLOSURE

The present disclosure is generally directed to systems, methods, and devices for wiring of network devices, in particular, toward a visually guided topology wiring scheme.

BACKGROUND

Physical topology creation may include a cumbersome process which involves connecting cables between network devices (e.g., peer devices in a network deployment). Additionally, the connections need to be accurate. Some types of network devices (e.g., switches, routers, peer devices, etc.) have large numbers of ports and thin front panels which can result in front panel plates of the network devices that display the port numbers becoming tough to read (e.g., especially when the devices are stacked higher and have connected cables). Further, with networking devices supporting multiple operating systems and with each operating system having its own port numbering convention, things become confusing to associate application-level port numbers based on which configurations are done to the front panel number on which the connections should be based. If some connection changes must be made (e.g., for debugging or replacement purposes), communicating those connection changes (e.g., from network administrator to lab technicians making those connection changes) can become tricky due to different port numbering schemes involved.

BRIEF SUMMARY

Example aspects of the present disclosure include:

A method, comprising: determining that a first end of a cable has been inserted at a first port of a first peer device; referencing a topology file to identify a second port of a second peer device with which the first peer device is intended to have a link; and activating an indicator associated with the second port to mimic an indicator associated with the first port.

Any of the aspects herein, wherein activating the indicator associated with the second port comprises causing the indicator associated with the second port to flash according to a flashing pattern of the indicator associated with the first port.

Any of the aspects herein, wherein activating the indicator associated with the second port comprises causing the indicator associated with the second port to produce a color that is similar or identical to a color of the indicator associated with the first port.

Any of the aspects herein, further comprising: establishing a connection between an application at the first peer device and an application at the second peer device, wherein the connection is established via a management network; and using the connection to determine capabilities for the indicator associated with the first port.

Any of the aspects herein, further comprising: determining that a second end of the cable has been inserted in the second port of the second peer device; and in response to determining that the second end of the cable has been inserted in the second port of the second peer device, changing a state of the indicator associated with the first port to an active state.

Any of the aspects herein, wherein the topology file is maintained by a Prescriptive Topology Manager (PTM) and wherein an application on the first peer device references the topology file via the PTM.

Any of the aspects herein, further comprising: determining a notification capability associated with the first port of the first peer device; determining a notification capability associated with the second port of the second peer device; and determining at least one commonality exists between the notification capability associated with the first port of the first peer device and the notification capability associated with the second port of the second peer device, wherein the at least one commonality is used to activate the indicator associated with the second port.

Any of the aspects herein, wherein the at least one commonality comprises at least one of a light color capability, a light blinking capability, and a light patterning capability.

Any of the aspects herein, further comprising: determining, after activating the indicator, that the cable has been inserted in the second port of the second peer device; in response to determining that the cable has been inserted in the second port of the second peer device, changing a state of the indicator associated with the first port to an active state; and in response to determining that the cable has been inserted in the second port of the second peer device, changing a state of the indicator associated with the second port to the active state.

Any of the aspects herein, wherein activating the indicator associated with the second port to mimic the indicator associated with the first port comprises flashing the indicator associated with the second port at approximately a same rate as the indicator associated with the first port.

Any of the aspects herein, wherein activating the indicator associated with the second port to mimic the indicator associated with the first port comprises illuminating the indicator associated with the second port at approximately a same color as the indicator associated with the first port.

Any of the aspects herein, wherein activating the indicator associated with the second port to mimic the indicator associated with the first port comprises substantially synchronizing a flashing of the indicator associated with the second port with a flashing of the indicator associated with the first port.

A system, comprising: a processor; and a memory coupled with and readable by the processor and storing therein instructions that, when executed by the processor, cause the processor to: determine that a first end of a cable has been inserted at a first port of a first peer device; reference a topology file to identify a second port of a second peer device with which the first peer device is intended to have a link; and activate an indicator associated with the second port to mimic an indicator associated with the first port.

Any of the aspects herein, wherein the instructions to activate the indicator associated with the second port are further executable by the processor to cause the indicator associated with the second port to flash according to a flashing pattern of the indicator associated with the first port.

Any of the aspects herein, wherein the instructions to activate the indicator associated with the second port are further executable by the processor to cause the indicator associated with the second port to produce a color that is similar or identical to a color of the indicator associated with the first port.

Any of the aspects herein, wherein the instructions further cause the processor to: establish a connection between an application at the first peer device and an application at the second peer device, wherein the connection is established via a management network; and use the connection to determine capabilities for the indicator associated with the first port.

Any of the aspects herein, wherein the instructions further cause the processor to: determine that a second end of the cable has been inserted in the second port of the second peer device; and in response to determining that the second end of the cable has been inserted in the second port of the second peer device, change a state of the indicator associated with the first port to an active state.

Any of the aspects herein, wherein the instructions further cause the processor to: determine a notification capability associated with the first port of the first peer device; determine a notification capability associated with the second port of the second peer device; and determine at least one commonality exists between the notification capability associated with the first port of the first peer device and the notification capability associated with the second port of the second peer device, wherein the at least one commonality is used to activate the indicator associated with the second port.

A first peer device, comprising: a plurality of ports; a plurality of indicators, wherein each indicator of the plurality of indicators corresponds to a respective port of the plurality of ports; an application; a processor; and a memory coupled with and readable by the processor and storing therein instructions that, when executed by the processor, cause the processor to: determine that a first end of a cable has been inserted at a first port of the plurality of ports of the first peer device; activate a first indicator of the plurality of indicators of the first peer device based at least in part on the determination, wherein the first indicator corresponds to the first port; reference, via the application, a topology file to identify a second port of a second peer device with which the first peer device is intended to have a link using the first port and the second port; and transmit an indication to an application at the second peer device to activate a second indicator associated with the second port to mimic the first indicator associated with the first port.

Any of the aspects herein, wherein the instructions further cause the processor to: establish a connection between the application at the first peer device and the application at the second peer device, wherein the connection is established via a management network; and use the connection to determine capabilities for the first indicator and the second indicator.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
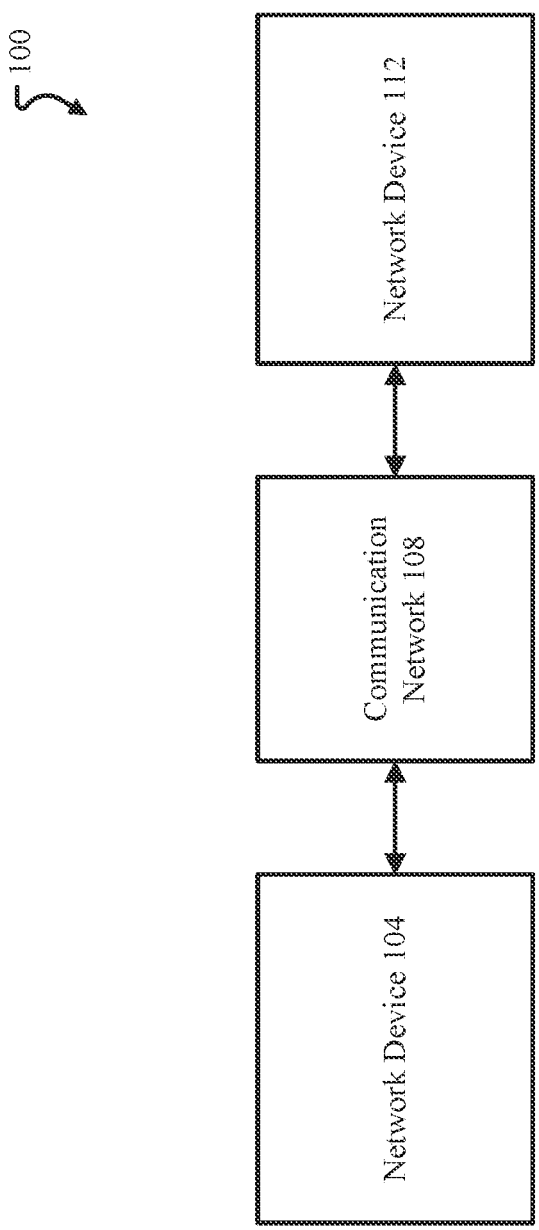
FIG. 1 illustrates a block diagram of a networking system according to at least one example embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Alternatively or additionally, functions may be implemented using machine learning models, neural networks, artificial neural networks, or combinations thereof (alone or in combination with instructions). Computer-readable media may include non-transitory computer-readable media, which corresponds to a tangible medium such as data storage media (e.g., random-access memory (RAM), read-only memory (ROM), electrically erasable programmable ROM (EEPROM), flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

In some cases, physical topology creation may include a cumbersome process which involves connecting cables between devices in a network deployment (e.g., switches, routers, peer devices, etc.). For example, physical topology creation may refer to a physical creation of a structural arrangement of a network, such as the arrangement of devices in the network (e.g., physically placing the devices into racks, cabinets, network switches, etc. at a datacenter), the wiring and physically connecting of the devices (e.g., using cables, wires, or other types of links). Additionally, the connections need to be accurate. That is, the connections between devices need to be made using specific ports of each device. For example, a first port of a first network device (e.g., peer device) may be intended to have a connection (e.g., link) specifically to a second port of a second network device, so it is important that respective ends of a cable connecting the first network device and the second network device are accurately inserted into the first port and into the second port, respectively.

Some types of network devices have large numbers of ports and thin front panels which can result in front panel plates of the network devices that display the port numbers becoming tough to read (e.g., especially when the devices are stacked higher and have connected cables) for identifying the specific ports when connecting the network devices via the ports. Further, with networking devices supporting multiple operating systems and with each operating system having its own port numbering convention, things become confusing to associate application-level port numbers based on which configurations are done to the front panel number on which the connections should be based. If some connection changes must be made (e.g., for debugging or replacement purposes), communicating those connection changes (e.g., from network administrator to lab technicians making those connection changes) can become tricky due to different port numbering schemes involved.

It is with respect to the above issues and other problems that the embodiments presented herein were contemplated.

Inventive concepts relate to using indicators (e.g., light-emitting diodes (LEDs)) to proactively find and indicate corresponding ports of different network devices (e.g., peer devices) that are intended to have a link (e.g., wired together via a cable). For example, an application described herein may leverage a topology file (e.g., Prescriptive Topology Manager (PTM) topology file) to determine which ports of which network devices are intended to have a link and may control LEDs (e.g., or other types of indicators) on these network devices to guide wiring of the determined ports. By leveraging the topology file and using the LEDs to guide the wiring, error rates when creating connections between network devices may be reduced, a wiring process may be sped up by quickly identifying which ports to connect, and a need for communication using port numbers (e.g., when attempting to find the correct ports when wiring) may be avoided because the signaling for identifying the corresponding ports of peer devices is done using the LEDs.

Most devices in datacenters (e.g., network devices) are equipped with port LEDs (e.g., individual indicators, such as LEDs, associated with each port of a device). The port LEDs are used to denote the port operation status and activity. For example, the link status of a port could be indicated by a solid green (e.g., or another solid color), while activity of the port (e.g., communications entering/exiting the port) would be indicated by blinking green (e.g., or another blinking/flashing color). Apart from this particular denotation of port operation status and activity, some devices may reserve a color (e.g., red, yellow, amber, etc.) to indicate any error scenarios (e.g., loss of power, communication errors, etc.). However, LEDs support a wider range of colors and patterns not being utilized for the port LEDs. As described herein, the unused LED patterns and/or colors may be used to create a visual guide for wiring of network devices (e.g., connecting respective ends of a cable on specific ports of two (2) peer network devices intended to have a link as indicated in a topology file). Some example colors and patterns may include solid red, blinking yellow, alternating blinking yellow and green, blinking amber at five (5) second intervals, or other colors and patterns not explicitly disclosed herein.

At a network operating system (NOS) level, an application (e.g., a Visual Wiring Guider (VWG) application) may be spawned when using the visually aided wiring method described herein. This application may have access to a topology file of a topology manager (e.g., the PTM) that indicates which ports of which network devices are intended to have a link or be connected. Additionally, the application may have the ability to create a transmission control protocol (TCP) connection to another instance of the same application in a different network device that is based on information in the applications. Additionally, the application may have access to the port LEDs, where the application can obtain a list of supported LED colors and patterns for each network device that are intended to be linked and is also able to program a specific color and pattern on demand for each network device. Additionally, the application can be notified of transceiver insertion events.

Based on these capabilities of the application and to initiate the visually aided wiring method described herein, a lab technician may insert a first end of a transceiver (e.g., a cable capable of transmitting/receiving communications between devices) into a first port on a first network device. When the application gets the transceiver notification (e.g., indicating the first end of the transceiver has been inserted into the first port), the application looks through the topology file of the topology manager to find which port of a second network device that is intended to have a link with the first port. In some examples, the first network device and the second network device may be referred to as peer devices (e.g., based on the first network device and the second network device intended to have a link and communicate with each other).

Once the application determines the port of the second network device that is to be linked to the first port of the first network device from the topology file (e.g., a second port of the second network device), the application may initiate a TCP session with a corresponding application of the second network device (e.g., remote device) and may exchange available patterns and colors that each network device is capable of displaying with their respective port LEDs. After both network devices exchange their LED color/pattern capabilities, the applications may pick a specific color and/or pattern indicator for this link. This selection of the specific color and/or pattern indicator may then be used for the first port of the first network device (e.g., local port) and the corresponding port of the second network device (e.g., remote port), such that LEDs associated with the first port and with the corresponding port illuminate or blink with this same unique color and/or pattern to act as a visual indicator on where the other end of the transceiver (e.g., other end or remote end of the cable) needs to be connected.

After the connection is made, the topology manager may validate the connection using the topology file. If the topology manager finds the connection to be accurate (e.g., either end of the transceiver is correctly inserted into the appropriate port of the corresponding network devices), the topology manager may notify the application, and the application may stop using the current pattern (e.g., selected to visually indicate the wiring) and may set the port LEDs to a regular link active pattern (e.g., such as solid green). Additionally or alternatively, if there is an error in the connection, the port LEDs are set to a regular error state (e.g., such as solid amber) such that the lab technician (e.g., or other user) would get visually notified of the error immediately and attempt to mitigate the error (e.g., change the connection).

Embodiments of the present disclosure provide technical solutions to one or more of the problems of (1) incorrectly connecting respective ends of a cable or other type of transceiver into ports of network devices that are intended to be linked (e.g., based on a topology file), (2) prolonging times for wiring processes of network devices, and (3) the need to know or communicate port numbers for the wiring processes. For example, an application described herein (e.g., the VWG application) may leverage a topology file (e.g., PTM topology file) to determine which ports of which network devices are intended to have a link and may control LEDs (e.g., or other types of indicators) on these network devices to guide wiring of the determined ports. By leveraging the topology file and using the LEDs to guide the wiring, error rates when creating connections between network devices may be reduced, a wiring process may be sped up by quickly identifying which ports to connect, and the need for communication of port numbers (e.g., when attempting to find the correct ports when wiring) may be avoided because the signaling for identifying the corresponding ports of peer devices is done using the LEDs.

Turning first to FIG. 1, a block diagram of a system 100 according to at least one embodiment of the present disclosure is shown. The system 100 may be used to visually indicate a wiring topography of ports on network devices (e.g., peer devices, switches, routers, etc.). For example, when connecting two (2) network devices to each other, a light on a first network device associated with a first port of the first network device may be lit according to a certain configuration (e.g., particular light color, particular flashing pattern, etc.), and a light on a second network device associated with a second port of the second networking device may be lit according to the same configuration as the light on the first network device (e.g., same light color, same flashing pattern, etc.) to indicate those ports are to be connected by respective ends of a same cable (e.g., or other types of connections or types of connectors).

The system 100 includes a network device 104, a communication network 108, and a network device 112. In at least one example embodiment, network devices 104 and 112 may correspond a network switch (e.g., an Ethernet switch), a collection of network switches, a network interface controller (NIC), or any other suitable device used to control the flow of data between devices connected to communication network 108. Each network device 104 and 112 may be connected to one or more of Personal Computer (PC), a laptop, a tablet, a smartphone, a server, a collection of servers, or the like. In one specific, but non-limiting example, each network device 104 and 112 includes multiple network switches in a fixed configuration or in a modular configuration.

Examples of the communication network 108 that may be used to connect the network devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the network devices 104 and 112 using Ethernet technology. In one specific, but non-limiting example, the network devices 104 and 112 correspond to peer devices described in greater detail below.

Although not explicitly shown, the network device 104 and/or the network device 112 may include storage devices and/or processing circuitry for carrying out computing tasks, for example, tasks associated with controlling the flow of data within each network device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random-Access Memory (RAM), Read-Only Memory (ROM), variants thereof, combinations thereof, or the like.

In some embodiments, the network device 104 and/or network device 112 may include an application stored in memory, such as a VWG application, which is spawned and responsible for supporting the visually aided wiring methods described herein. In some embodiments, the VWG application at any network device 104, 112 may be initiated when a cable is inserted into a port of the network device 104, 112. The VWG application at a network device 104, 112 may then identify the counterpart network device 104, 112 that should be connected to based on a reference to a topology file. The topology file may be maintained by a topology manager (e.g., a PTM), that is provided within one of the network devices 104, 112 and/or within a switch in the communication network 108. The VWG application provided at the network device 104 may be configured to identify that the network device 104 should be connected with network device 112 based on information in the topology file. The topology file may be maintained at a centralized PTM or may be maintained in parts at a number of PTMs, which may be distributed among one or more of the network devices 104, 112.

In some embodiments, the memory and processor of the network device 104, 112 may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an IC chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a PCB or collection of PCBs. It should be appreciated that any appropriate type of electrical component or collection of electrical components may be suitable for inclusion in the processing circuitry.

In addition, although not explicitly shown, it should be appreciated that the network devices 104 and 112 include one or more communication interfaces for facilitating wired and/or wireless communication between one another and other unillustrated elements of the system 100.

FIGS. 2A, 2B, 2C, and 2D illustrate operations 200, 201, 202, and 203, respectively, of a visually guided topology wiring scheme in accordance with aspects of the present disclosure. Before two (2) network devices (or more) can communicate with each other, physical connections may need to be made between the two (2) network devices. For example, a lab technician may physically insert respective ends of a transceiver (e.g., cable) into specific ports of the network devices. The lab technician may determine the specific ports based on wiring diagrams and/or topology files that indicate or list which ports of which network devices are intended to have a link. In some cases, the ports may be indicated or listed using port numbers that corresponds to the specific ports of the network devices. As such, the lab technician may need to locate and read the port numbers on each network device to ensure the connection between the network devices is made using the correct ports. However, the port numbers may be hard to read, such that the lab technician may incorrectly read the port numbers and may not make the correct connection. The operations 200, 201, 202, and 203 of the visually guided topology wiring scheme described herein and with reference to FIGS. 2A, 2B, 2C, and 2D may reduce errors made when creating connections between network devices.

As shown in the example of FIGS. 2A, 2B, 2C, and 2D, a first network device 204 may be intended to have a link with a second network device 208. In some examples, the first network device 204 and the second network device 208 may be referred to as peer devices. Additionally, each network device may include a set of indicators and a set of ports, where each indicator is associated with a respective port. For example, the first network device 204 may include a set of indicators 212 and a set of ports 216, where a first indicator 212A is associated with a first port 216A, a second indicator 212B is associated with a second port 216B, a third indicator 212C is associated with a third port 216C, a fourth indicator 212D is associated with a fourth port 216D, a fifth indicator 212E is associated with a fifth port 216E, and a sixth indicator 212F is associated with a sixth port 216F. Similarly, the second network device 208 may include a set of indicates 220 and a set of ports 224, where a first indicator 220A is associated with a first port 224A, a second indicator 220B is associated with a second port 224B, a third indicator 220C is associated with a third port 224C, a fourth indicator 220D is associated with a fourth port 224D, a fifth indicator 220E is associated with a fifth port 224E, and a sixth indicator 220F is associated with a sixth port 224F.

In some examples, each indicator may be used to indicate a status or activity of its associated port (e.g., a first color/pattern to indicate the port is online and/or active, a second color/pattern to indicate the port is having communication errors, etc.). For example, each indicator may be an LED (or other type of light source) that correspond to a respective port. While each network device is shown as having six (6) indicators and ports in the examples of FIGS. 2A, 2B, 2C, and 2D, it is understood that the network devices may have a lesser or greater number of indicators and ports.

The intended link between the first network device 204 and the second network device 208 and any other links between these network devices and/or other network devices in a network environment (e.g., datacenter) may be listed in a topology file (e.g., and/or wiring diagram). A topology manager (e.g., PTM) may store this topology file along with other information. In some examples, this topology manager may serve as a dynamic cabling verification tool to help detect and eliminate connection errors. For example, the topology manager may take a specified network cabling plan (e.g., something many operators already generate and that is stored in a topology.dot file) and may couple the cabling plan with runtime information (e.g., derived from a Link Layer Discovery Protocol (LLDP)) to verify that the actual cabling and connections match the cabling plan. The topology manager may be provided at a centralized controller in the system 100 or may be distributed among a number of the network devices 104, 112.

A sequence of a flow for the visually guided topology wiring scheme described herein is shown with the example of the operations 200, 201, 202, and 203 of FIGS. 2A, 2B, 2C, and 2D, respectively. While the visually guided topology wiring scheme is discussed from a networking device perspective, this application can be applicable to other devices in a network topology, such as servers, storage devices, NICs, etc. Additionally, a number of cables (or more generally transceivers) that can be connected in parallel in a device may be equal to a number of LED patterns and colors that the device(s) can support and has available to use. One example of parallel cabling is shown in the example of operation 203 of FIG. 2D below.

Figure 2A:
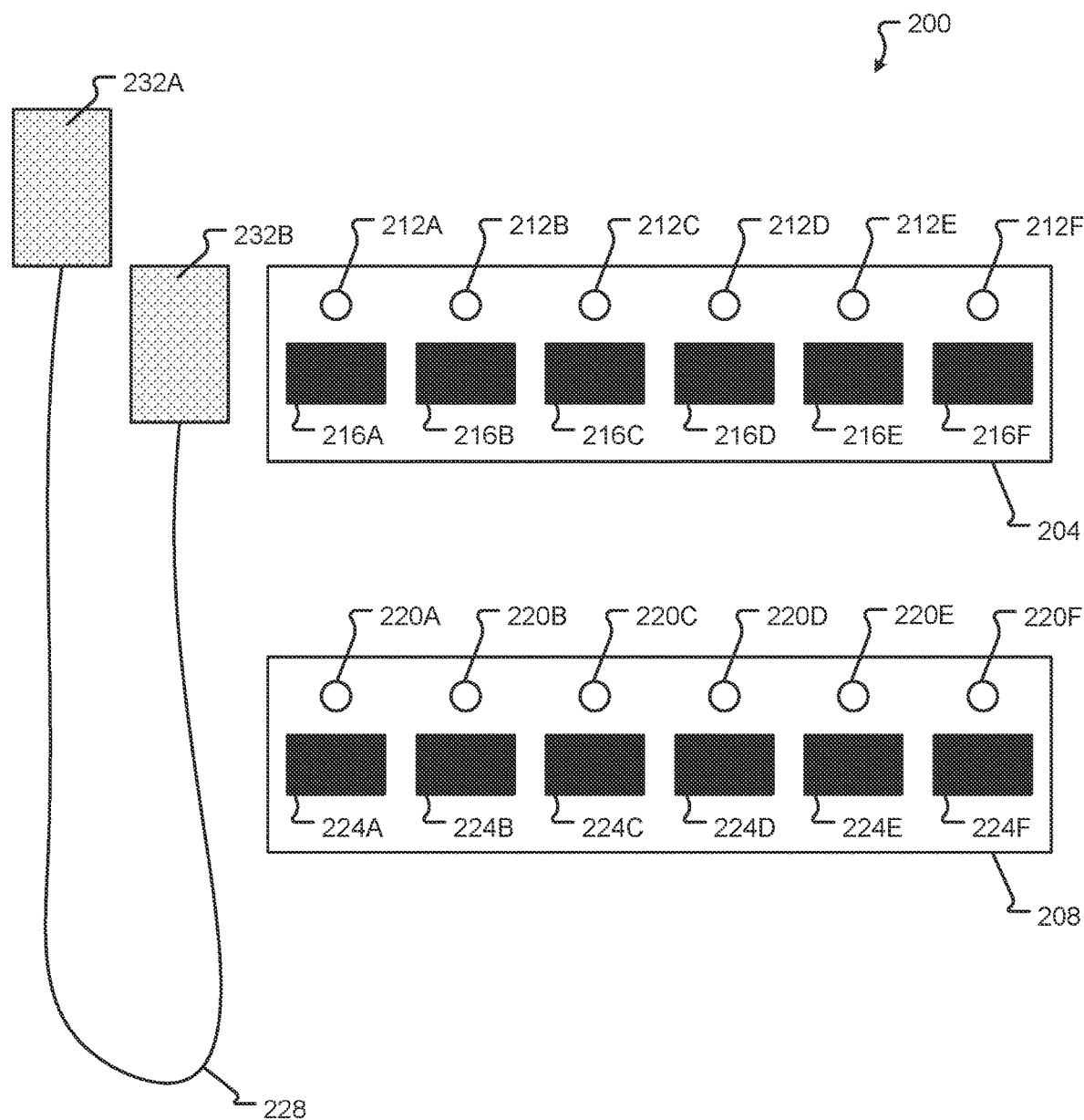
FIGS. 2A to 2D illustrate different operations of a visually guided topology wiring scheme according to at least one example embodiment of the present disclosure.

Turning to the operation 200 as shown in the example of FIG. 2A, a lab technician may intend to connect respective ends of a cable 228 to specific ports of the first network device 204 and the second network device 208 (e.g., where the ports are specified in the topology file). For example, the cable may include a first end 232A and a second end 232B, where the first end 232A can be inserted into a first port (e.g., of the first network device 204 or the second network device 208) intended for the link between the devices and the second end 232B can be inserted into a second port (e.g., of the first network device 204 or the second network device 208) intended for the link, or vice versa. Initially, the indicators 212A and the indicators 220 (e.g., LEDs) associated with the ports are not illuminated (e.g., do not glow).

Figure 2B:
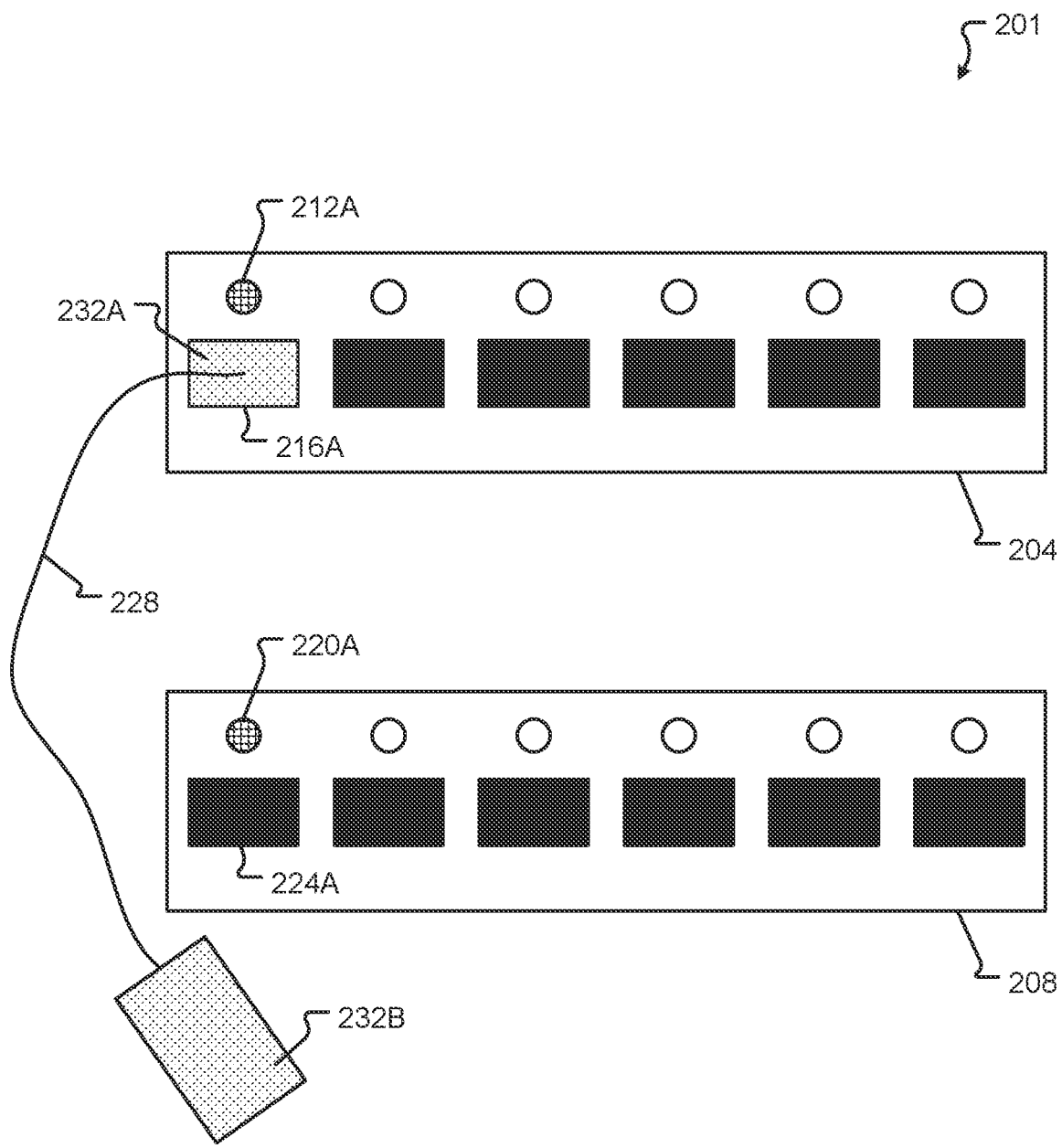

For operation 201 as shown in the example of FIG. 2B, the lab technician (e.g., user) may take the cable 228 and may insert the first end 232A into the first port 216A of the first network device 204 (e.g., insert a transceiver into on one of the ports of one of the network devices). The first indicator 212A associated with the first port 216A may start to glow in a particular color and/or pattern (e.g., solid, bright yellow). The first indicator 220A associated with the first port 224A of the second network device 208 (e.g., LED associated with an unconnected port of a peer device) may also glow with the same color and/or pattern. In some examples, the particular color and/or pattern chosen to be used for the first indicator 212A and the first indicator 220A may be determined or chosen based on indicator capabilities of each network device. For example, an application (e.g., VWG application) of the first network device 204 may communicate with a corresponding application of the second network device 208 (e.g., using an established TCP session) to determine which colors and/or patterns the indicators of each network device are capable of producing or using. Subsequently, the application(s) may select a color and/or pattern to use for illuminating the indicators of those ports that are to be connected via the cable 228 based on overlapping colors and/or patterns that the indicators of both network devices are capable of producing or using.

Accordingly, the lab technician may identify the peer device and port that is to be connected with the first port 216A of the first network device 204 based on which indicator of the peer device is glowing in the same manner as the first indicator 212A associated with the first port 216A. For example, the lab technician may identify that the first port 224A of the second network device 208 is to be connected to the first port 216A of the first network device 204 based on the first indicator 212A and the first indicator 220A glowing in the same manner (e.g., the first indicator 220A of the second network device 208 mimics the first indicator 212A of the first network device 204).

Figure 2C:
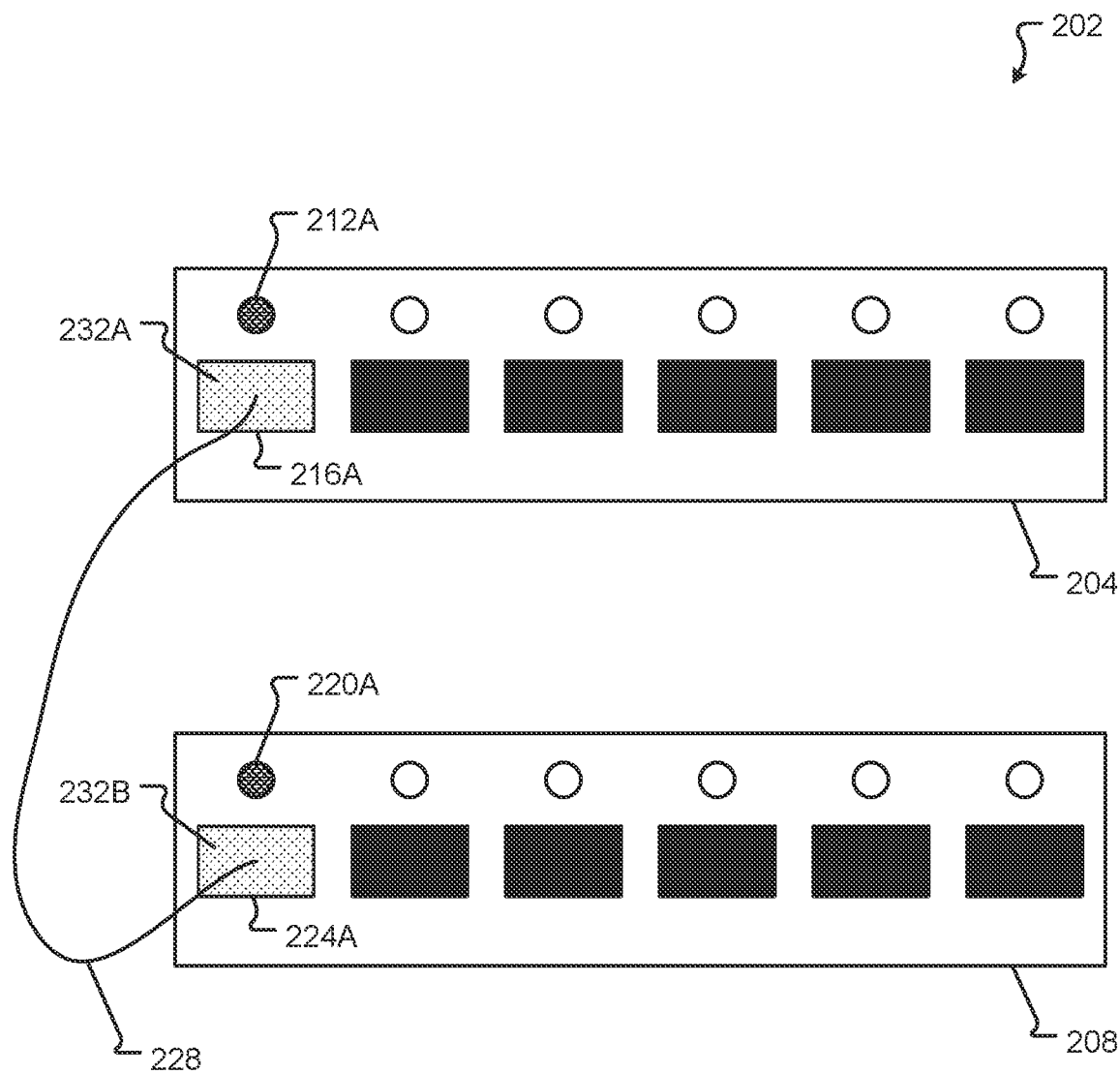

In the operation 202 as shown in the example of FIG. 2C, after identifying the peer port and device for the first port 216A of the first network device 204 based on which indicators are glowing the same, the lab technician may connect the second end 232B of the cable 228 to the identified port. For example, the lab technician may connect the second end 232B of the cable 228 to the first port 224A of the second network device 208. Subsequently, a topology manager (e.g., PTM) may verify and validate the connection is correct between the first port 216A and the first port 224A (e.g., based on information from the topology file). Once the connection is validated, the indicators associated with the first ports 216A and 224A may begin glowing to indicate an active state for the associated ports (e.g., the indicators turn into an active state). In some examples, the color and/or pattern used for the glowing of the indicators when indicating which ports are to be connected (e.g., as shown in the example of the operation 201 and FIG. 2B) may be different than the color and/or pattern used for the glowing of the indicators when indicating the active state of the ports (e.g., as shown in the example of the operation 202 and FIG. 2C).

Figure 2D:
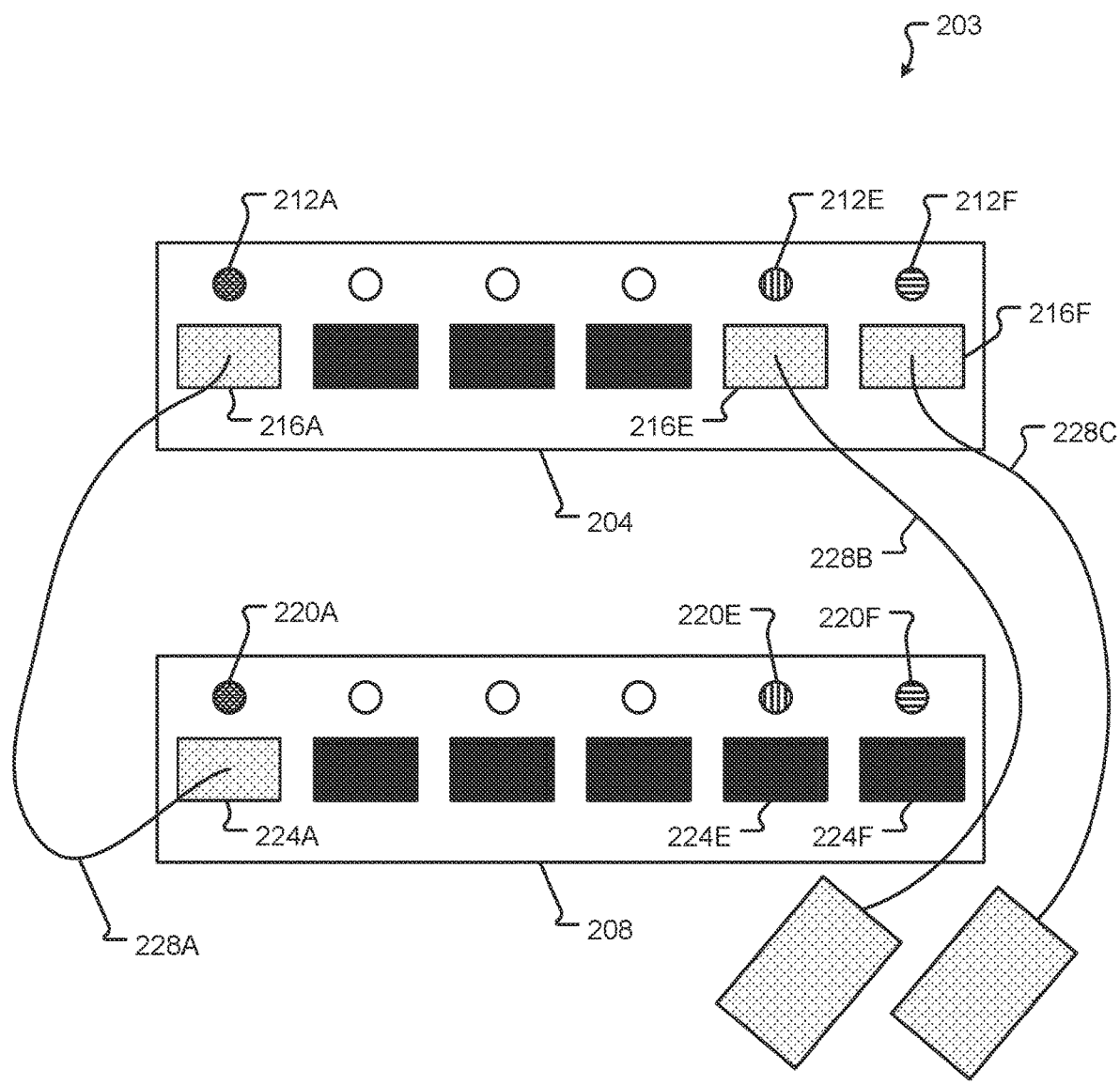

The operation 203 as shown in the example of FIG. 2D may illustrate multiple parallel connections that can be made between respective ports of the first network device 204 and the second network device 208. For example, a first connection using a first cable 228A may already be made between the first port 216A and the first port 224A of the network devices as described with reference to FIGS. 2A-2C. Additionally, based on the topology file, a second connection using a second cable 228B may be intended to be made between the fifth port 216E of the first network device 204 and the fifth port 224E of the second network device 208, and a third connection using a third cable 228C may be intended to be made between the sixth port 216F of the first network device 204 and the sixth port 224F of the second network device 208. Accordingly, the fifth indicator 212E associated with the fifth port 216E and the fifth indicator 220E associated with the fifth port 224E may glow with a same (or similar) color and/or pattern to indicate those ports are to be connected to each other (e.g., via the second cable 228B). Similarly, the sixth indicator 212F associated with the sixth port 216F and the sixth indicator 220F associated with the sixth port 224F may glow with a same (or similar) color and/or pattern to indicate those ports are to be connected to each other (e.g., via the third cable 228C).

In some examples, the color and/or pattern used to indicate which ports are to be connected for the second connection may be different than the color and/or pattern used to indicate which ports are to be connected for the third connection (e.g., so as to not confuse the lab technician as to which ports are to be connected). For example, if a same color and/or pattern was used to indicate different sets of ports that are to be linked, the lab technician may incorrectly link two ports that should not be connected. Accordingly, the number of parallel connections that can be made at a given time may depend on the number of available colors and/or patterns that the indicators of each network device are capable of producing or using. For example, if the two (2) network devices have four (4) unique colors and/or patterns that their respective indicators are both capable of producing, then four (4) (or fewer) parallel connections may be supported at a given time for the network devices.

Figure 3:
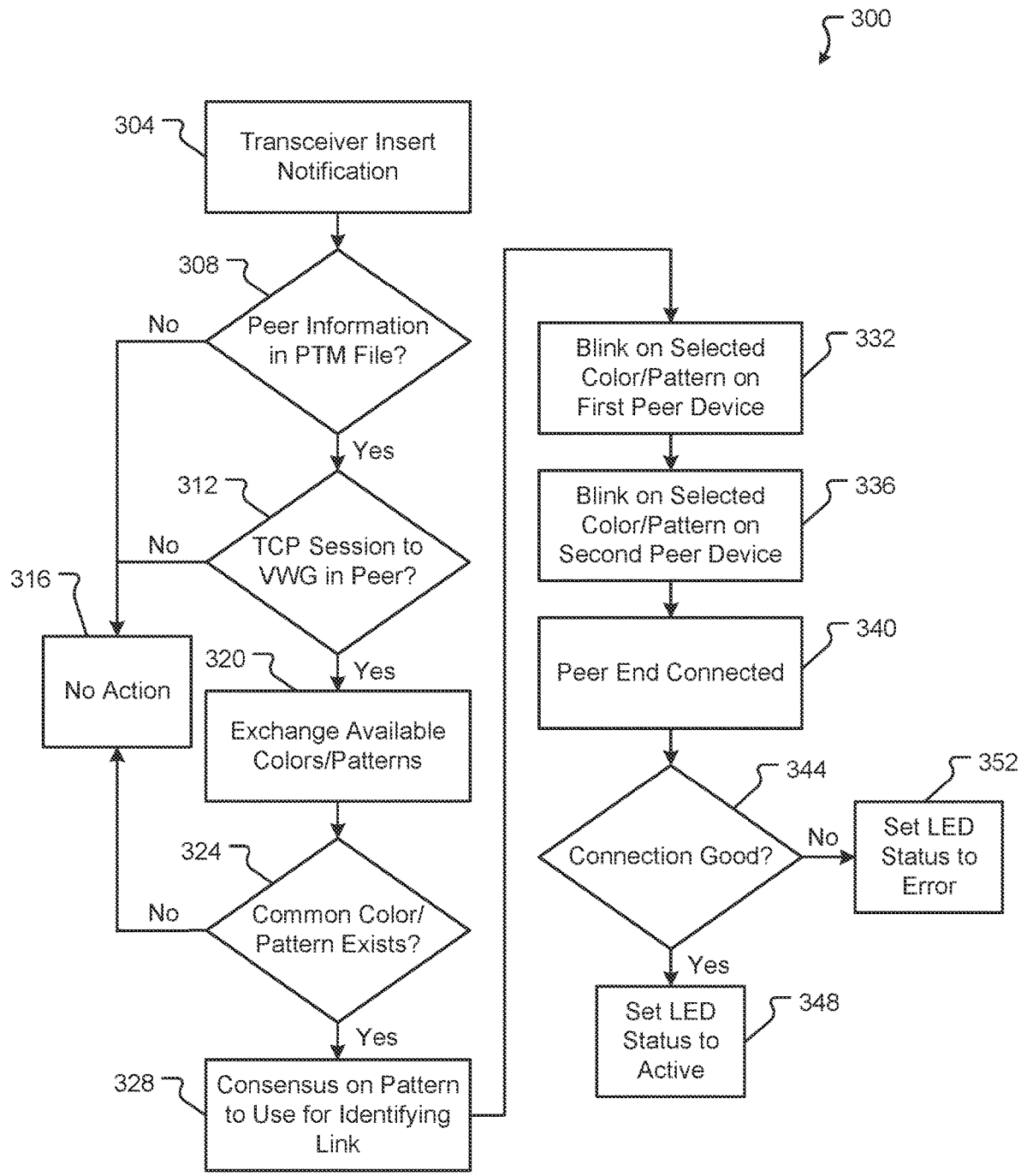
FIG. 3 illustrates a flowchart in accordance with embodiments of the present disclosure.

FIG. 3 illustrates a flowchart 300 in accordance with aspects of the present disclosure. The flowchart 300 may include different steps or operations for performing the visually guided topology wiring scheme as described herein. For example, the flowchart 300 may be used to visually indicate which ports of peer devices (e.g., network devices that are intended to have a link) are to be connected (e.g., via a cable or other type of transceiver) by illuminating indicators associated with those ports in a same manner (e.g., the indicators associated with the ports mimic each other). The steps and operations of the flowchart 300 may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. For example, the steps and operations of the flowchart 300 may be carried out or otherwise performed by an application (e.g., VWG application) and/or topology manager (e.g., PTM) as described herein.

At operation 304 of the flowchart 300, a notification may be received that a transceiver has been inserted into a first port of a first network device. For example, the transceiver may be a first end of a cable that has been inserted into the first port. This notification may be received at an application of the first network device or at a computing device, where the application is spawned or initiated based on the notification. The application may be spawned to support the visually guided topology wiring scheme. As described previously, the application may have access to a topology file of a topology manager (e.g., the PTM) that indicates which ports of which network devices are intended to have a link or be connected. Additionally, the application may have the ability to create a TCP connection or session to another instance of the same application in a different network device that is based on information in the applications. Additionally, the application may have access to port LEDs, where the application can obtain a list of supported LED colors and patterns for each network device that are intended to be linked and is also able to program a specific color and pattern on demand for each network device. Additionally, the application can be notified of transceiver insertion events.

At operation 308, the application may determine if peer information corresponding to the first port (e.g., of which the transceiver has been inserted) is in the topology file (e.g., PTM file or PTM topology file). For example, the application may determine if the topology file includes an indication of a second port of a second network device that the first port is intended to have a link. If the topology file does include the indication of the second port, the flowchart 300 continues to an operation 312. If the topology file does not include an indication of a port to which the first port is intended to have a link, the flowchart 300 proceeds to operation 316 and no action occurs.

At operation 312, if the topology file does include the indication of the second port and the second network device, the application may check whether a TCP session has been or can be established with a corresponding application at the second network device (e.g., a VWG application in the peer device associated with the first network device). If the TCP session cannot be established, the application at the first network device may perform no action (e.g., operation 316). Alternatively, if the TCP session can be and has been established, at operation 320, the application of the first network device may exchange available color and/or patterns that indicators of the first network device are capable of producing or using with the corresponding application of the second network device, and the corresponding application of the second network device may also exchange available color and/or patterns that indicators of the second network device are capable of producing or using.

At operation 324, the application at the first network device may determine whether any common colors and/or patterns exist between the colors/patterns that the indicators of the first network device are capable of producing and the colors/patterns that the indicators of the second network device are capable of producing. If there are no common supported colors/patterns for the indicators of both network devices, the application of the first network device may perform no action (e.g., operation 316). Alternatively, if there is at least one common supported color/pattern between the indicators of both network devices, at operation 328, the application of the first network device and the corresponding application of the second network device may reach a consensus on a specific color and/or pattern to use for identifying which ports of each network device are intended to be linked.

At operation 332, the application of the first network device (e.g., first peer device) may cause a first indicator associated with the first port to blink and/or glow according to the selected color and/or pattern from operation 328. Additionally, at operation 336, the corresponding application of the second network device (e.g., second peer device) may cause a second indicator associated with the second port that is intended to be linked to the first port to also blink and/or glow according to the selected color and/or pattern from operation 328. Accordingly, based on both the first port and the second port blinking and/or glowing according to the same selected color and/or pattern, a lab technician can correctly link the two ports together (e.g., via inserting respective ends or transceivers of a cable into the two ports). For example, at operation 340, the other end of the cable to which the first port has been connected may be connected to the second port of the second network device (e.g., the peer end is connected). In some examples, the application of the first network device may receive a notification that the peer end has been connected.

At operation 344, the connection between the first port of the first network device and second port of the second network device may be verified and validated based on the topology file. For example, the topology manager may verify whether the connection between the first port and the second port is correct and whether the connection is good. If the connection is correct and good, the flowchart 300 may proceed to operation 348 and may set the indicators associated with each linked port to an active status (e.g., setting the LEDs associated with each port to indicate an active status, such as causing the LEDs to glow a solid green). Alternatively, if the connection is incorrect and/or a bad connection, the flowchart 300 may proceed to operation 352 and may set the indicators associated with each linked port to an error status (e.g., setting the LEDs associated with each port to indicate an error status, such as causing the LEDs to glow a solid red or amber or to blink with red or amber). Accordingly, if the indicators are set to the error status, the lab technician can attempt to mitigate the error and/or change the connection while still on site with the network devices.

Figure 4:
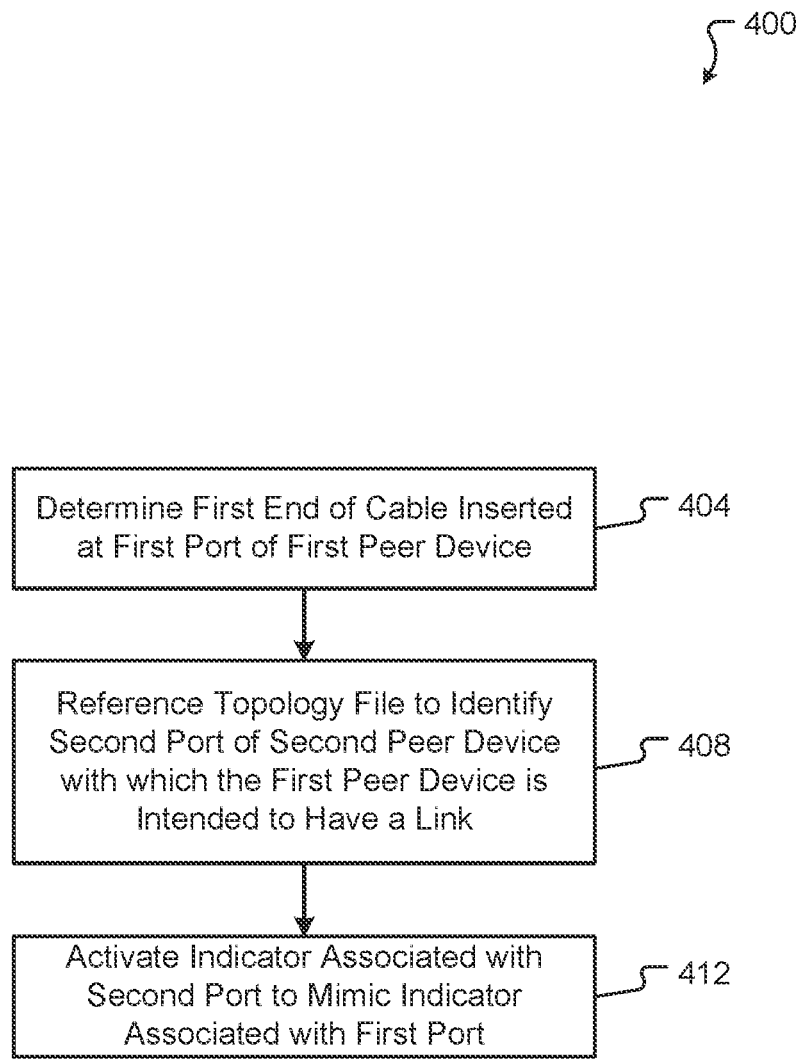
FIGS. 4, 5, and 6 illustrate flow diagrams in accordance with embodiments of the present disclosure.

FIG. 4 depicts a method 400 that may be used, for example, to perform the visually guided topology wiring scheme as described herein. For example, the flowchart 300 may be used to visually indicate which ports of peer devices (e.g., network devices that are intended to have a link) are to be connected (e.g., via a cable or other type of transceiver) by illuminating indicators associated with those ports in a same manner (e.g., the indicators associated with the ports mimic each other).

The method 400 (and/or one or more steps thereof) may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. A processor other than any processor described herein may also be used to execute the method 400. The at least one processor may perform the method 400 by executing elements stored in a memory such as the memory of a computing device, a network device, or a peer device as described above. The elements stored in the memory and executed by the processor may cause the processor to execute one or more steps of a function as shown in method 400. One or more portions of a method 400 may be performed by the processor executing any of the contents of memory.

The method 400 comprises determining that a first end of a cable has been inserted at a first port of a first peer device (step 404). For example, an application at the first peer device may receive a notification that the first end of the cable has been inserted into the first port (e.g., transceiver insertion events). In some examples, the application is spawned when the first end of the cable has been inserted at the first port.

The method 400 also comprises referencing a topology file to identify a second port of a second peer device with which the first peer device is intended to have a link (step 408). For example, the application at the first peer device may reference the topology file to find a specific port with which the first port is intended to be connected. In some examples, the topology file may be maintained by a PTM, and the application on the first peer device may reference the topology file via the PTM.

The method 400 also comprises activating an indicator associated with the second port to mimic an indicator associated with the first port (step 412). In some examples, activating the indicator associated with the second port may include causing the indicator associated with the second port to flash according to a flashing pattern of the indicator associated with the first port. Additionally or alternatively, activating the indicator associated with the second port may include causing the indicator associated with the second port to produce a color that is similar or identical to a color of the indicator associated with the first port. Additionally or alternatively, activating the indicator associated with the second port to mimic the indicator associated with the first port may include flashing the indicator associated with the second port at approximately a same rate as the indicator associated with the first port. Additionally or alternatively, activating the indicator associated with the second port to mimic the indicator associated with the first port may include illuminating the indicator associated with the second port at approximately a same color as the indicator associated with the first port. Additionally or alternatively, activating the indicator associated with the second port to mimic the indicator associated with the first port may include substantially synchronizing a flashing of the indicator associated with the second port with a flashing of the indicator associated with the first port.

In some examples, after the indicator associated with the second port is activated to mimic the indicator associated with the first port, a second of the cable may be determined to have been inserted in the second port of the second peer device (e.g., by a lab technician or other user). For example, the application of the first peer device may receive a notification or otherwise determine that the second end of the cable has been inserted in the second port of the second peer device. Subsequently, in response to determining that the second end of the cable has been inserted in the second port of the second peer device, a state of the indicator associated with the first port may be changed to an active state. In some examples, the PTM may verify the connection between the first port and the second port is correct prior to the state of the indicator associated with the first port being changed to the active state. Additionally, in response to determining that the cable has been inserted in the second port of the second peer device, a state of the indicator associated with the second port may also be changed to the active state.

The present disclosure encompasses embodiments of the method 400 that comprise more or fewer steps than those described above, and/or one or more steps that are different than the steps described above.

Figure 5:
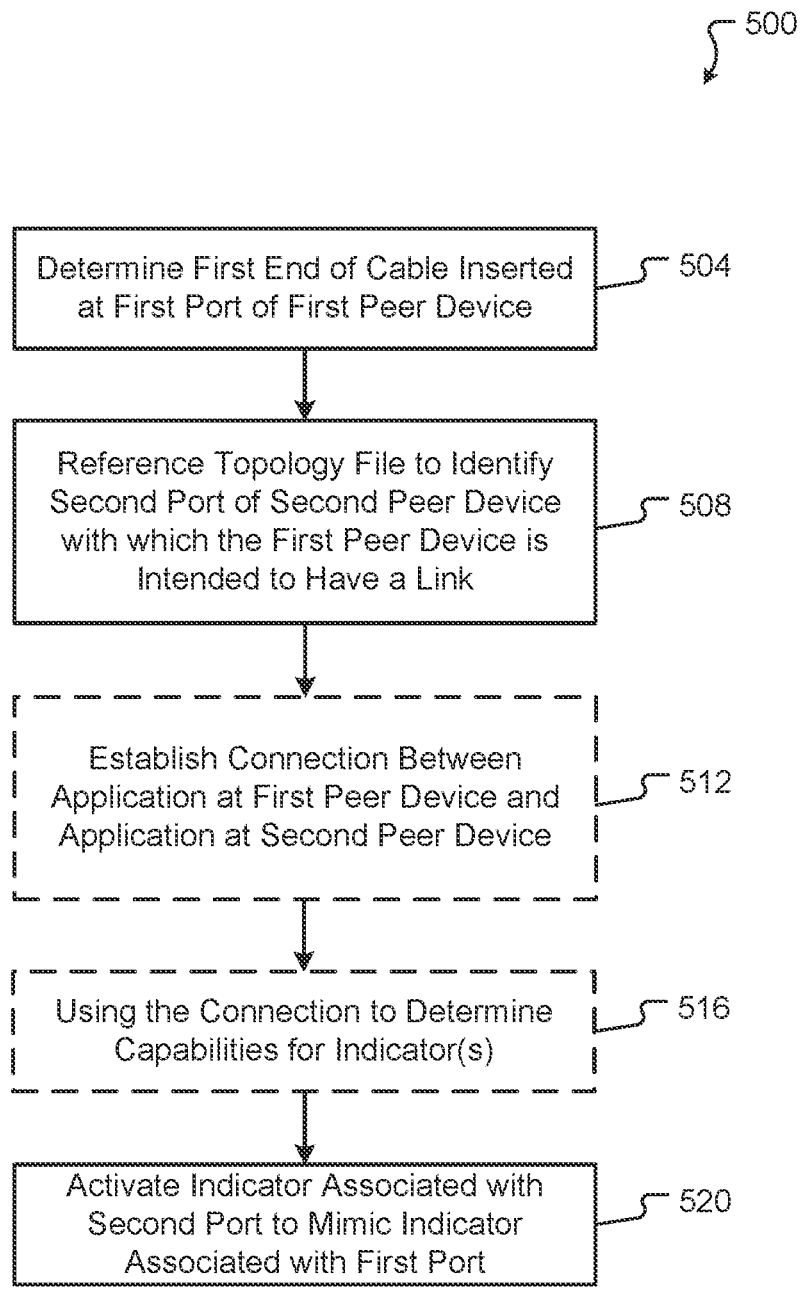

FIG. 5 depicts a method 500 that may be used, for example, to determine capabilities of indicators associated with respective ports of different network devices as part of performing the visually guided topology wiring scheme as described herein.

The method 500 (and/or one or more steps thereof) may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. A processor other than any processor described herein may also be used to execute the method 500. The at least one processor may perform the method 500 by executing elements stored in a memory such as the memory of a computing device, a network device, or a peer device as described above. The elements stored in the memory and executed by the processor may cause the processor to execute one or more steps of a function as shown in method 500. One or more portions of a method 500 may be performed by the processor executing any of the contents of memory.

The method 500 comprises determining that a first end of a cable has been inserted at a first port of a first peer device (step 504). The method 500 also comprises referencing a topology file to identify a second port of a second peer device with which the first peer device is intended to have a link (step 508).

The method 500 also comprises establishing a connection (e.g., TCP connection or session) between an application (e.g., VWG application) at the first peer device and an application (e.g., VWG application) at the second peer device, where the connection is established via a management network (step 512). The method 500 also comprises using the connection to determine capabilities for the indicator associated with the first port (step 516). Additionally, the connection may be used to determine capabilities for the indicator associated with the second port. For example, the connection may be used to determine colors and/or patterns that indicators of the first peer device and of the second peer device are both capable of producing or using.

The method 500 also comprises activating an indicator associated with the second port to mimic an indicator associated with the first port (step 520). In some examples, the indicator associated with the second port may be activated to mimic the indicator associated with the first port based on the determined capabilities for the indicator(s).

The present disclosure encompasses embodiments of the method 500 that comprise more or fewer steps than those described above, and/or one or more steps that are different than the steps described above.

Figure 6:
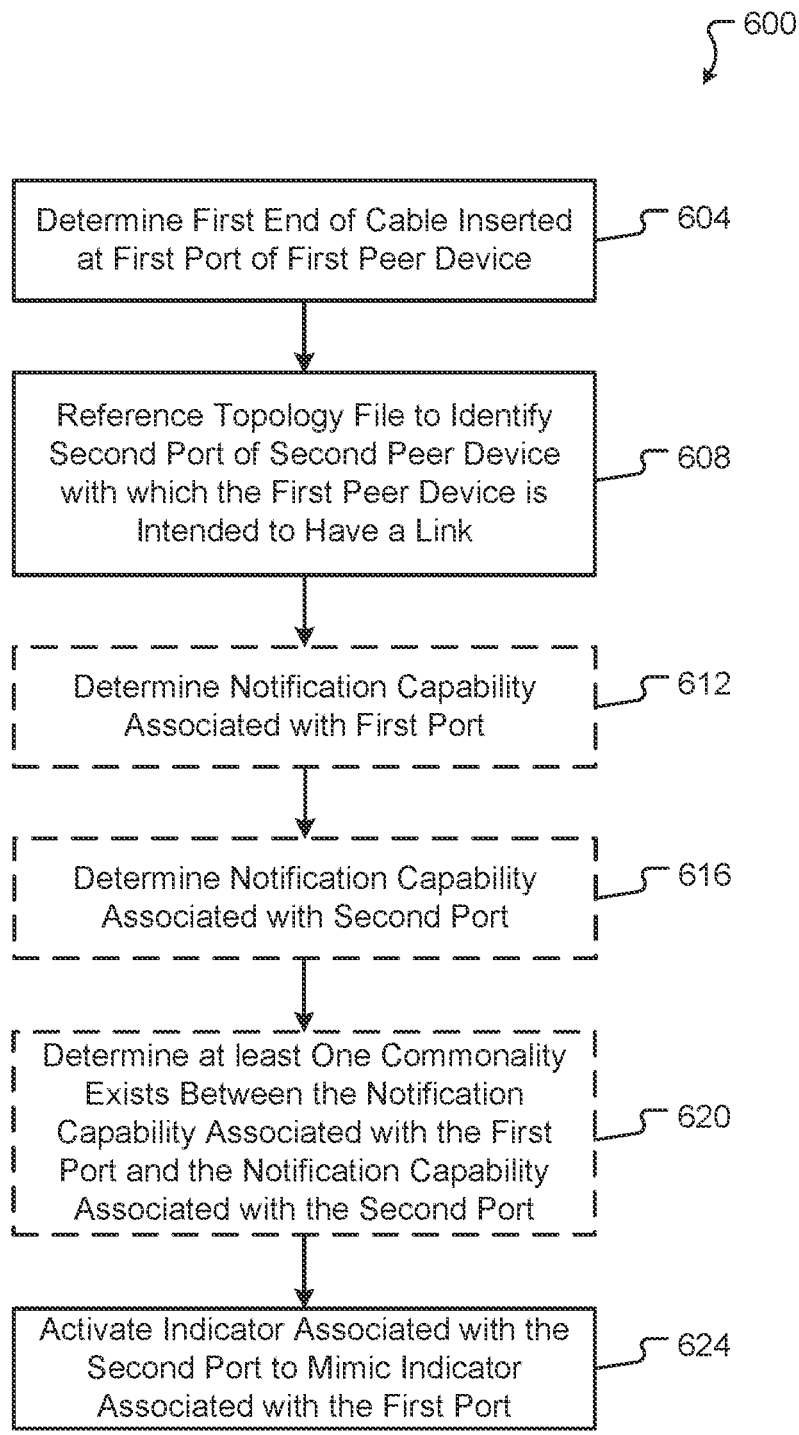

FIG. 6 depicts a method 600 that may be used, for example, to determine notification capabilities associated with ports of different network devices as part of performing the visually guided topology wiring scheme as described herein.

The method 600 (and/or one or more steps thereof) may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. A processor other than any processor described herein may also be used to execute the method 600. The at least one processor may perform the method 600 by executing elements stored in a memory such as the memory of a computing device, a network device, or a peer device as described above. The elements stored in the memory and executed by the processor may cause the processor to execute one or more steps of a function as shown in method 600. One or more portions of a method 600 may be performed by the processor executing any of the contents of memory.

The method 600 comprises determining that a first end of a cable has been inserted at a first port of a first peer device (step 604). The method 600 also comprises referencing a topology file to identify a second port of a second peer device with which the first peer device is intended to have a link (step 608).

The method 600 also comprises determining a notification capability associated with the first port of the first peer device (step 612). The method 600 also comprises determining a notification capability associated with the second port of the second peer device (step 616). For example, the notification capabilities associated with the respective ports may include which colors and/or patterns that indicators associated with each port are capable of producing or using.

The method 600 also comprises determining at least one commonality exists between the notification capability associated with the first port of the first peer device and the notification capability associated with the second port of the second peer device (step 620). In some examples, the at least one commonality may include at least one of a light color capability, a light blinking capability, and a light patterning capability.

The method 600 also comprises activating an indicator associated with the second port to mimic an indicator associated with the first port (step 624). In some examples, the at least one commonality may be used to activate the indicator associated with the second port.

The present disclosure encompasses embodiments of the method 600 that comprise more or fewer steps than those described above, and/or one or more steps that are different than the steps described above.

As noted above, the present disclosure encompasses methods with fewer than all of the steps identified in FIGS. 4, 5, and 6 (and the corresponding description of the methods 400, 500, and 600), as well as methods that include additional steps beyond those identified in FIGS. 4, 5, and 6 (and the corresponding description of the methods 400, 500, and 600). The present disclosure also encompasses methods that comprise one or more steps from one method described herein, and one or more steps from another method described herein. Any correlation described herein may be or comprise a registration or any other correlation.

Any of the steps, functions, and operations discussed herein can be performed continuously and automatically.

The exemplary systems and methods of this disclosure have been described in relation to a dual connect switch module. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein.

Every numerical range given throughout this disclosure is deemed to include each and every narrower numerical range that falls within such broader numerical range, as if such narrower numerical ranges were all expressly written herein.

What is claimed is:

1. A method, comprising:
   determining that a first end of a cable has been inserted at a first port of a first peer device;
   referencing a topology file to identify a second port of a second peer device with which the first peer device is intended to have a link;
   determining a notification capability associated with the first port of the first peer device;
   determining a notification capability associated with the second port of the second peer device;
   determining at least one commonality exists between the notification capability associated with the first port of the first peer device and the notification capability associated with the second port of the second peer device; and
   activating an indicator associated with the second port using the at least one commonality, thereby causing the indicator associated with the second port to mimic an indicator associated with the first port that is also using the at least one commonality.

2. The method of claim 1, wherein activating the indicator associated with the second port comprises causing the indicator associated with the second port to flash according to a flashing pattern of the indicator associated with the first port.

3. The method of claim 1, wherein activating the indicator associated with the second port comprises causing the indicator associated with the second port to produce a color that is similar or identical to a color of the indicator associated with the first port.

4. The method of claim 1, further comprising:
establishing a connection between an application at the first peer device and an application at the second peer device, wherein the connection is established via a management network; and
using the connection to determine capabilities for the indicator associated with the first port.

5. The method of claim 1, further comprising:
determining that a second end of the cable has been inserted in the second port of the second peer device; and
in response to determining that the second end of the cable has been inserted in the second port of the second peer device, changing a state of the indicator associated with the first port to an active state.

6. The method of claim 1, wherein the topology file is maintained by a Prescriptive Topology Manager (PTM) and wherein an application on the first peer device references the topology file via the PTM.

7. The method of claim 1, wherein the at least one commonality comprises at least one of a light color capability, a light blinking capability, and a light patterning capability.

8. The method of claim 1, further comprising:
determining, after activating the indicator, that the cable has been inserted in the second port of the second peer device;
in response to determining that the cable has been inserted in the second port of the second peer device, changing a state of the indicator associated with the first port to an active state; and
in response to determining that the cable has been inserted in the second port of the second peer device, changing a state of the indicator associated with the second port to the active state.

9. The method of claim 1, wherein activating the indicator associated with the second port to mimic the indicator associated with the first port comprises flashing the indicator associated with the second port at approximately a same rate as the indicator associated with the first port.

10. The method of claim 1, wherein activating the indicator associated with the second port to mimic the indicator associated with the first port comprises illuminating the indicator associated with the second port at approximately a same color as the indicator associated with the first port.

11. The method of claim 1, wherein activating the indicator associated with the second port to mimic the indicator associated with the first port comprises substantially synchronizing a flashing of the indicator associated with the second port with a flashing of the indicator associated with the first port.

12. A system, comprising:
a processor; and
a memory coupled with and readable by the processor and storing therein instructions that, when executed by the processor, cause the processor to:
determine that a first end of a cable has been inserted at a first port of a first peer device;
reference a topology file to identify a second port of a second peer device with which the first peer device is intended to have a link;
establish a connection between an application at the first peer device and an application at the second peer device, wherein the connection is established via a management network;
use the connection to determine capabilities for the indicator associated with the first port;
identify at least one commonality that exists between a capability for the indicator associated with the first port and a capability for an indicator associated with the second port; and
activate the indicator associated with the second port using the at least one commonality, thereby causing the indicator associated with the second port to mimic the indicator associated with the first port that is also using the at least one commonality.

13. The system of claim 12, wherein the instructions to activate the indicator associated with the second port are further executable by the processor to cause the indicator associated with the second port to flash according to a flashing pattern of the indicator associated with the first port.

14. The system of claim 12, wherein the instructions to activate the indicator associated with the second port are further executable by the processor to cause the indicator associated with the second port to produce a color that is similar or identical to a color of the indicator associated with the first port.

15. The system of claim 12, wherein the instructions further cause the processor to:
determine that a second end of the cable has been inserted in the second port of the second peer device; and
in response to determining that the second end of the cable has been inserted in the second port of the second peer device, change a state of the indicator associated with the first port to an active state.

16. The system of claim 12, wherein the at least one commonality comprises a light color capability.

17. A first peer device, comprising:
a plurality of ports;
a plurality of indicators, wherein each indicator of the plurality of indicators corresponds to a respective port of the plurality of ports;
an application;
a processor; and
a memory coupled with and readable by the processor and storing therein instructions that, when executed by the processor, cause the processor to:
determine that a first end of a cable has been inserted at a first port of the plurality of ports of the first peer device;
activate a first indicator of the plurality of indicators of the first peer device based at least in part on the determination, wherein the first indicator corresponds to the first port;
reference, via the application, a topology file to identify a second port of a second peer device with which the first peer device is intended to have a link using the first port and the second port;
identify, via the application, at least one commonality that exists between the first indicator and a second indicator associated with the second port; and
transmit an indication to an application at the second peer device to activate the second indicator associated with the second port using the identified at least one commonality, thereby causing the indicator associated with the second port to mimic the first indicator associated with the first port that is also using the identified at least one commonality.

18. The first peer device of claim 17, wherein the instructions further cause the processor to:
- establish a connection between the application at the first peer device and the application at the second peer device, wherein the connection is established via a management network; and
- use the connection to determine capabilities for the first indicator and the second indicator.

19. The system of claim 12, wherein the at least one capability comprises a light blinking capability.

20. The system of claim 12, wherein the at least one capability comprises a light patterning capability.

\* \* \* \* \*